United States Patent
Brück

[19]

[11] Patent Number: 5,865,864
[45] Date of Patent: Feb. 2, 1999

[54] HONEYCOMB BODY HAVING CHANNELS OF DIFFERENT FLOW RESISTANCE THROUGH WHICH A FLUID CAN FLOW AND APPARATUS HAVING THE HONEYCOMB BODY FOR CLEANING EXHAUST GAS

[75] Inventor: Rolf Brück, Bergisch Gladbach, Germany

[73] Assignee: Emitec Gesellschaft fuer Emissionstechnologie mbH, Lohmar, Germany

[21] Appl. No.: 917,572
[22] Filed: Aug. 20, 1997

Related U.S. Application Data

[63] Continuation of PCT/EP96/00611 Feb. 13, 1996.

[30] Foreign Application Priority Data

Feb. 20, 1995 [DE] Germany .................. 195 05 727.9

[51] Int. Cl.$^6$ .................................................. B01D 46/52
[52] U.S. Cl. .................. 55/482; 55/486; 55/521; 55/525; 55/DIG. 30
[58] Field of Search ................ 95/286, 287; 55/486, 55/487, 488, 489, 485, 482, 523, 525, 521, DIG. 30; 60/311

[56] References Cited

U.S. PATENT DOCUMENTS

| | | | |
|---|---|---|---|
| 4,390,355 | 6/1983 | Hammond, Jr. et al. | 55/523 |
| 4,441,899 | 4/1984 | Takagi et al. | 55/487 |
| 4,659,348 | 4/1987 | Mayer | 55/487 |
| 4,662,911 | 5/1987 | Hirayama et al. | 55/482 |
| 4,704,863 | 11/1987 | Abthoff et al. | 55/487 |
| 5,104,627 | 4/1992 | Usui et al. | 55/DIG. 30 |
| 5,110,561 | 5/1992 | Hitachi et al. | 55/488 |
| 5,130,100 | 7/1992 | Serizawa | 55/488 |
| 5,171,335 | 12/1992 | Kojima et al. | 55/523 |
| 5,173,267 | 12/1992 | Maus et al. | 55/DIG. 30 |
| 5,190,732 | 3/1993 | Maus et al. | 55/DIG. 30 |
| 5,300,133 | 4/1994 | Schuster et al. | 55/489 |
| 5,346,675 | 9/1994 | Usui et al. | 55/DIG. 30 |
| 5,655,366 | 8/1997 | Kawamura | 55/487 |

FOREIGN PATENT DOCUMENTS

| | | |
|---|---|---|
| 0 336 106 B1 | 2/1989 | European Pat. Off. . |
| 0 542 775 B1 | 7/1991 | European Pat. Off. . |
| 0 542 805 B1 | 7/1991 | European Pat. Off. . |
| 92/02717 | 7/1991 | WIPO . |

OTHER PUBLICATIONS

Japanese Patent Abstract No. 3188925 (Yuuzou et al.), dated Dec. 19, 1989.
Japanese Patent Abstract No. 55155742 (Yoshinori), dated May 22, 1979.
Ultra–Low Power Electrically–Heated Catalyst System (Kueper et al.), SAE Technical Paper Series 940465, dated 1994.
Published International Application No. 92/13636 (Breuer et al.), dated Jan. 29, 1992.

(List continued on next page.)

*Primary Examiner*—Duane S. Smith
*Attorney, Agent, or Firm*—Herbert L. Lerner; Laurence A. Greenberg

[57] ABSTRACT

A honeycomb body, in particular a catalyst carrier body, includes a multiplicity of channels through which a fluid can flow. A first group of channels has a higher flow resistance than a second group of channels and the honeycomb body has at least one cross-sectionally asymmetrical accumulation or collection of channels of higher flow resistance covering only part of the cross-sectional area of the honeycomb body in the circumferential direction. The channels of higher flow resistance in particular have smaller hydraulic diameters than the other channels or are provided at inlet and/or the outlet ends and/or in their interiors with additional structures for hindering flow. Honeycomb bodies can thus be produced in which distributions of flow resistances over the cross-sectional area can be defined and matched to flow conditions, which can be particularly advantageous when such a honeycomb is disposed downstream of electrically heatable honeycomb bodies with slits.

17 Claims, 3 Drawing Sheets

OTHER PUBLICATIONS

Published International Application No. 90/08249 (Maus et al.), dated Jan. 16, 1990.

Published International Application No. 91/01178 (Swars), dated Jul. 5, 1990.

Published international Application No. 91/01807 (Maus et al.), dated Jul. 16, 1990.

Published International Application No. 92/02716 (Maus et al.), dated Jul. 24, 1991.

HONEYCOMB BODY HAVING CHANNELS OF DIFFERENT FLOW RESISTANCE THROUGH WHICH A FLUID CAN FLOW AND APPARATUS HAVING THE HONEYCOMB BODY FOR CLEANING EXHAUST GAS

CROSS-REFERENCE TO RELATED APPLICATION

This application is a continuation of International Application Serial No. PCT/EP96/00611, filed Feb. 13, 1996.

BACKGROUND OF THE INVENTION

FIELD OF THE INVENTION

The present invention relates to a honeycomb body, in particular a catalyst carrier body, for catalytic conversion of exhaust gases in an exhaust system. Such honeycomb bodies are preferentially used in motor vehicles having Diesel or Otto engines. The present invention also relates to an apparatus having the honeycomb body for cleaning exhaust gas.

Honeycomb bodies of the type referred to above are known in a great number of different versions. They may be made and in particularly extruded, from ceramic material. Another type of honeycomb body includes wound, stacked and/or intertwined layers of sheet metal, at least some of which are structured. The flow resistance of a channel in such a honeycomb body depends on its shape and the structure of its walls. Its shape and size determine a hydraulic diameter, while structures and/or obstacles at the ends and/or in the interior of the channel can further increase the flow resistance.

In pipe systems, flows generally have an approximately parabolic velocity profile, at which the flow velocity is highest in the middle and zero at the edge. It is also already known to construct honeycomb bodies in such a way that the flow resistance in a central region is greater than in outer regions. Such honeycomb bodies are described in Published European Patent Application 0 336 106 B1 and Published European Patent Application 0 542 805 B1, corresponding to International Patent Application WO 92/02717, for instance. The prior art generally assumes that the flows are approximately rotationally symmetrical, and therefore honeycomb bodies with different channel cross sections always have an approximately symmetrical, generally concentric configuration of channels of different cross sections. In honeycomb bodies of oval or elliptical cross section, corresponding configurations with two axes of symmetry at right angles to one another are the goal.

It is also known from International Patent Applications WO 90/08249, corresponding to U.S. Pat. No. 5,157,010, WO 91/01178 and WO 91/01807 to provide structures in the interior of channels of a honeycomb body that increase the flow resistance. In the case of the present invention, reference is expressly made to the honeycomb bodies and production processes described in those disclosures.

In Published European Patent Application 0 542 775 B1, corresponding to U.S. Pat. No. 5,328,774, a honeycomb body is also described which has an increasing number of channels in the flow direction per unit of cross-sectional area, even though it is monolithic in structure. Those structural forms are likewise significant to the present invention, and therefore that disclosure is also expressly incorporated by reference. It has been found that in some exhaust systems, symmetrical flow conditions do not prevail, especially in the area near the engine. Due to installation conditions, honeycomb bodies that are used in catalytic converters, especially in the area near the engine, experience an eccentric and/or asymmetrical oncoming flow, so that at certain points, especially heavy loads on the end surface of the honeycomb bodies with consequent damage and shortened service lives are the result.

When electrically heatable honeycomb bodies are used as well, there is an uneven oncoming flow to a downstream honeycomb body, since for purposes of electrical subdivision electrically heatable honeycomb bodies can have air gaps, which have a lesser flow resistance than the channels of the electrically heatable honeycomb body.

An apparatus for catalytic conversion of exhaust gases in an exhaust system, which is known from International Patent Application WO 92/13636, corresponding to U.S. Pat. No. 5,382,774, has at least two spaced-apart honeycomb bodies, disposed one after the other in terms of the flow direction of an exhaust gas. Each honeycomb body has channels through which a fluid can flow. Near the flow axis, support elements are provided, by which the honeycomb bodies are joined together and braced against one another. The honeycomb body which is first in terms of the flow direction is electrically heatable. The electrically heatable honeycomb body is electrically subdivided over its cross-sectional area by ceramic insulating layers, causing an electric current to flow along a path defined by the subdivision. The electrically heatable honeycomb body has the task of minimizing pollutant emissions during a cold-starting phase of an internal combustion engine.

It is also known to provide the electrical insulation of the electrically conductive path through a heatable honeycomb body, relative to adjacent portions, by using an air gap. Such a configuration is described in an article by P. F. Küper et al entitled "Ultra-Low Power Electrically-Heated Catalyst System", in SAE Technical Papers Series 940465. The air gap brings about an uneven flow through the honeycomb bodies, since some of the fluid to be converted flows through the air gap as a function of the structure of the individual honeycomb bodies. That would occur in particular if the size of the channels in the first honeycomb body were made similar to or smaller than the gap width, which has therefore been avoided until now. Due to that fact, some of the fluid in the cold-starting phase is unconverted or only inadequately converted, or else a portion of the downstream honeycomb body is more heavily loaded.

SUMMARY OF THE INVENTION

It is accordingly an object of the invention to provide a honeycomb body having channels of different flow resistance through which a fluid can flow and an apparatus having the honeycomb body for cleaning exhaust gas, which overcome the hereinafore-mentioned disadvantages of the heretofore-known devices of this general type and which can compensate for an eccentric and/or asymmetrical and/or uneven oncoming flow, so that the flow is made uniform and a catalytic conversion that is approximately uniform for all flow regions is attained.

With the foregoing and other objects in view there is provided, in accordance with the invention, a honeycomb body, in particular a catalyst carrier body, comprising a given cross-sectional area; a circumference defining a circumferential direction; and a multiplicity of channels through which a fluid can flow; the channels including a first group of channels having a higher flow resistance and a second group of channels having a lower flow resistance;

and the channels including at least one cross-sectionally asymmetrical accumulation or collection of channels with an elevated flow resistance, the accumulation or collection encompassing only a portion of the given cross-sectional area as seen in the circumferential direction.

Through the use of the invention, it is possible to furnish optimized honeycomb bodies for every kind of application, by providing a distribution of flow resistance in the honeycomb body in accordance with the distribution of flow (which is ascertained from experiments or by calculation). In regions with a stronger oncoming flow, the flow resistance is then raised over at least a portion of the axial length of the honeycomb body, by providing smaller channels and/or channels with additional structures that raise the flow resistance in these regions.

This can be employed with many structural types of honeycomb bodies, but it is especially easily achievable in metal honeycomb bodies including sheet-metal layers at least some of which are structured. In particular, honeycomb bodies including at least one stack of intertwined sheet-metal layers can be very easily modified, by using sheet-metal layers with different heights of structures in certain regions, in such a way that they are adapted to certain oncoming flow conditions. Both individual eccentric oncoming flow regions and two or more regions with an eccentric oncoming flow can thus be balanced through the use of suitable structural changes.

With the foregoing and other objects in view there is provided, in accordance with the invention, an apparatus for cleaning exhaust gas, comprising a first electrically heatable honeycomb body and a second honeycomb body downstream of the first honeycomb body, for conducting a flow through the honeycomb bodies in succession; the first honeycomb body having a multiplicity of channels through which a fluid can flow, a cross-sectional area, and at least one air gap electrically dividing the first honeycomb body over the cross-sectional area, in particular in meandering and/or spiral form; and the second honeycomb body having a given cross-sectional area, a circumference defining a circumferential direction, a given region opposite the at least one air gap, and a multiplicity of channels through which a fluid can flow, the channels including a first group of channels having a higher flow resistance and a second group of channels having a lower flow resistance, and the channels including at least one cross-sectionally asymmetrical accumulation or collection of channels with an elevated flow resistance, the accumulation or collection disposed at least in the given region providing a higher flow resistance than in a remaining region and encompassing only a portion of the given cross-sectional area as seen in the circumferential direction.

In the application to so-called tandem constructions with a heating first catalytic converter that precedes a second honeycomb body, the invention is also based on the fundamental concept that through the use of a purposeful adjustment of the distribution of the flow resistance in the second honeycomb body, the flow behavior of the fluid in the first honeycomb body can be varied as well, and thus the catalytic total effectiveness of the apparatus can be increased. The flow behavior of the fluid can be varied by providing the second honeycomb body with a higher flow resistance, at least in the region opposite the air gap, than in the remaining region of the honeycomb body. The result which is attained by this provision is that the volumetric flow of fluid through the air gap is reduced, and the fluid flows more uniformly to the second honeycomb body. The proportion of fluid that comes into contact with the catalytically active surface of the first honeycomb body is thus increased, and therefore the conversion rate in the cold-starting phase is improved.

In accordance with another feature of the invention, in order to increase the flow resistance of the second honeycomb body, it is proposed that the second honeycomb body be constructed with a greater number of channels per unit of cross-sectional area in the region of the second honeycomb body opposite the air gap, than in the remaining region of the honeycomb body, while taking into account the cross-sectional area of the air gap. The prerequisite for this is generally that the two honeycomb bodies be similar in structure, as will be described in further detail in conjunction with the exemplary embodiments.

An increase in the flow resistance can be attained through the use of additional structures in the channels, instead of by reducing the channel cross sections in certain regions. These two provisions can be used individually or together in order to attain regions of different flow resistances. Additional structures, in most configurations, can have a favorable effect on diffusion processes in the honeycomb body and can therefore bring about greater catalytic activity.

The number of channels per unit of cross-sectional area, both in the region opposite the air gap and in the remaining cross-sectional region, may be constant over the entire length of the flow path along the second honeycomb body. The same applies logically to additional structures as well. Particularly in the case of long honeycomb bodies, this can cause an undesirably high overall pressure loss in the apparatus. An apparatus is therefore preferably proposed that has a second honeycomb body with a number of channels which varies in the flow direction, with reference to the cross-sectional area. The number of channels in the region opposite the air gap can decrease further in the flow direction. A reduction in the number of channels, with a constant cross-sectional area, leads to an increase in the free flow cross section in the channel. As a result, a desired flow profile downstream of the second honeycomb body or downstream of the apparatus can be established, which can also be important for noise abatement in the exhaust system.

The cross section of the channels can be optimized depending on the length of the second honeycomb body, so that on one hand the flow resistance in the region opposite the air gap is great enough that it causes a more uniform distribution of fluid, and on the other hand the total pressure loss of the apparatus does not become too high.

In accordance with a further feature of the invention, the number of channels initially increases and then decreases in the flow direction. In this way, a honeycomb body can, for instance, be made that is symmetrical relative to its installation direction, so that errors in installation cannot occur. Noise-abating properties of a honeycomb body can also be exploited under some circumstances through the use of such configurations.

The article by P. F. Küper et al discloses an apparatus in which a plurality of elongated support elements, that have cross-sectional areas of different sizes in their end segments, extends between the first and second honeycomb bodies and joins them mechanically but insulates them electrically from one another. Each support element protrudes with its thicker end segment at least partway into a channel of the first honeycomb body and with its thinner end segment into a channel of the second honeycomb body. The first, electrically heatable honeycomb body has a lesser number of channels with respect to the cross-sectional area than the second honeycomb body.

In contrast to that known device, in accordance with an added feature of the invention, the cross-sectional area of the end segment of each support element protruding into the channel of the second honeycomb body, is larger than the cross-sectional area of the end segment protruding into the channel of the first honeycomb body. To that end, the second honeycomb body has channels dimensioned in such a way that their cross section can receive the support elements without destruction of the walls that define the channel.

In accordance with an additional feature of the invention, there is provided one or more corrugated sheet-metal layers of greater corrugation height than the other sheet-metal layers of the second honeycomb body.

In accordance with a concomitant feature of the invention, the honeycomb body is assembled in a manner that is known per se from sheet-metal layers which extend in an approximately S shape as seen in cross section. Such a honeycomb body can be made by intertwining the ends of a stack of sheet metal layers. In such a honeycomb body, it is possible to form different portions of the stack of variously markedly corrugated sheet metal layers, in order to achieve the desired layout. In general, alternatingly disposed smooth and structured sheet metal layers are used. The structured sheet-metal layers have different structures, and in particular different corrugation heights. The different structures of the various sheet-metal stacks perform different tasks. The honeycomb body may, for instance, include two sheet-metal stacks, with each sheet-metal stack per se including sheet-metal layers of the same structure but different corrugation heights. The first sheet-metal stack and the second sheet-metal stack are intertwined in such a way that the first sheet-metal stack, which has a larger number of channels per unit of cross-sectional area, is opposite the air gap, and only the second sheet-metal stack receives the support elements. The honeycomb body can also contain additional stacks of sheet metal layers of differing corrugation height. The structures may be of various lengths longitudinally, so that the flow resistance in the longitudinal direction of the honeycomb body varies, as is known per se from Published European Patent Application 0 542 775 B1, corresponding to U.S. Pat. No. 5,328,774, the entire content of which is hereby expressly incorporated by reference.

Other features which are considered as characteristic for the invention are set forth in the appended claims.

Although the invention is illustrated and described herein as embodied in a honeycomb body having channels of different flow resistance through which a fluid can flow and an apparatus having the honeycomb body for cleaning exhaust gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
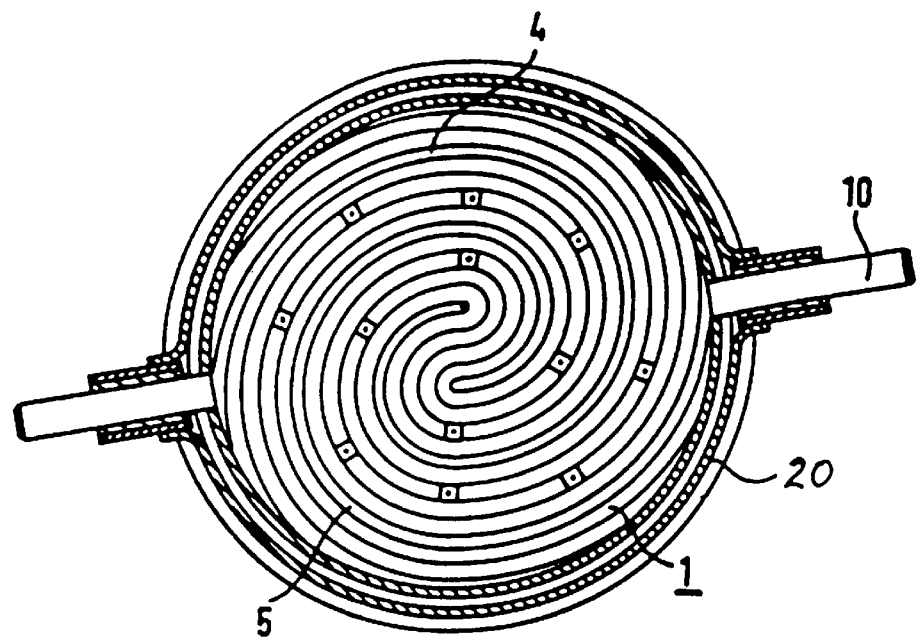
FIG. 1 is a diagrammatic, partly-sectional front-elevational view of an apparatus according to the invention.
Figure 2:
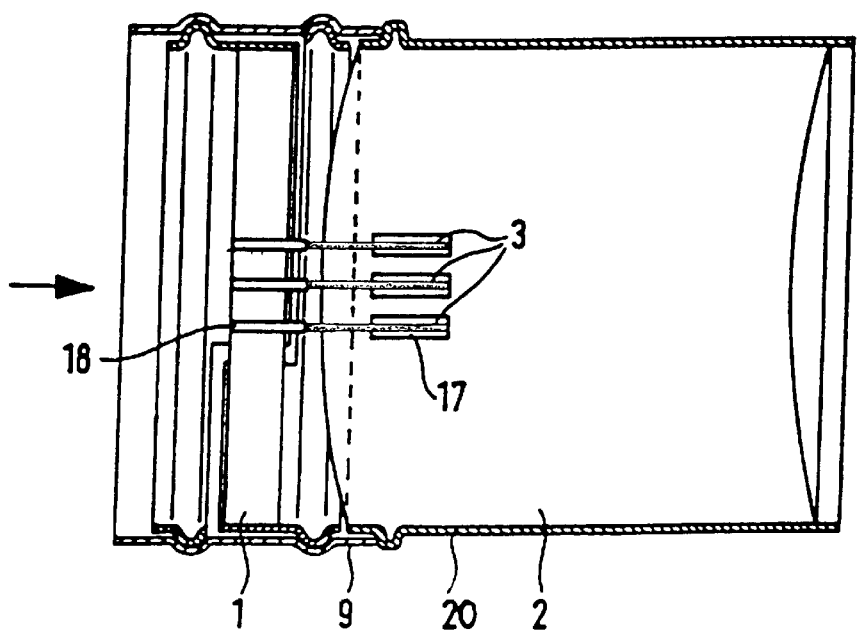
FIG. 2 is a longitudinal-sectional view through the apparatus of FIG. 1.

Referring now to the figures of the drawings in detail and first, particularly, to FIGS. 1 and 2 thereof, there is seen a preferred exemplary embodiment of an apparatus according to the invention. The apparatus for catalytic conversion of exhaust gases in an exhaust system, especially for an internal combustion engine and preferably for an Otto engine, includes a first honeycomb body 1, which is spaced apart from a second honeycomb body 2 in a jacket tube 20. A spacing between the two honeycomb bodies is 1 to 6 mm, for example, and an end surface of the second honeycomb body may be convexly curved somewhat. The second honeycomb body 2 serves as a support for the first, shorter honeycomb body. Through the use of support elements 3, the two honeycomb bodies 1 and 2 are joined together, and the first honeycomb body 1, which has a greater tendency to oscillation, is braced against the second honeycomb body 2. The first honeycomb body 1 is electrically heatable and has an electrically insulating gap.

The support elements 3 have a thin end segment 18 protruding into the first honeycomb body 1, and a thick end segment 17 protruding into the second honeycomb body 2. The thin end segment 18 has a smaller cross-sectional area than the thick end segment 17.

In order to provide electrical heating of the first honeycomb body 1, it is joined to electrically insulating electric supply lines 10 and 11 that are passed through a jacket 9. In the exemplary embodiment, the first honeycomb body 1 is a body which is made in a manner that is known per se from a stack of sheet metal layers intertwined in an S shape. The first honeycomb body 1 is electrically divided over its cross-sectional area by air gaps 4, 5.

Figure 3:
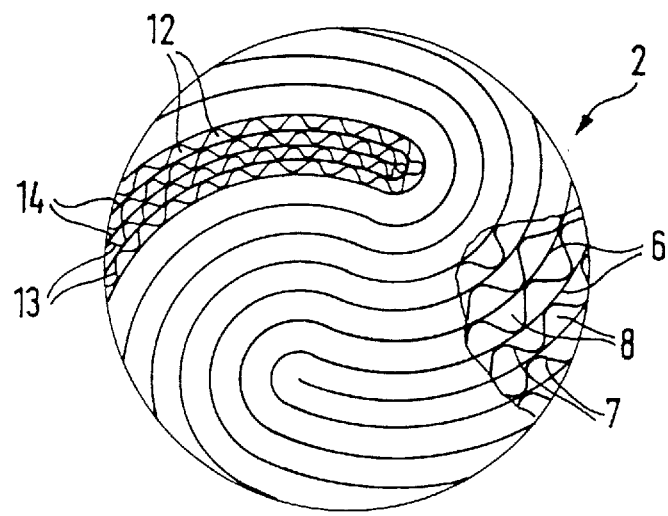
FIG. 3 is a front-elevational view of a second honeycomb body.

The second honeycomb body, which is diagrammatically shown in FIG. 3, likewise includes a stack of sheet metal layers intertwined in an S. It is very helpful for the sake of simplicity of manufacture of the apparatus according to the invention if both honeycomb bodies (unlike what is shown) are of similar construction (for instance, with the same stack height) and are oriented relative to one another in such a way that the directions and location of the intertwinings are the same. The stack includes smooth sheet-metal layers 6 and structured sheet-metal layers 7. The layers 6 and 7 define channels 8, through which a fluid can flow. The second honeycomb body 2 has a higher number of smaller channels 12 per unit of cross-sectional area in a given region opposite the air gap 4, 5, than in a remaining region. The channels 12 are likewise defined by structured sheet-metal layers 13 and smooth sheet-metal layers 14. If the size of the channels 8 is insufficient to receive the thick end segments 17 of the support elements 3, then one or more corrugated sheet-metal layers with a greater corrugation height may also be provided for receiving the support elements 3, but they need not necessarily extend over the entire axial length of the second honeycomb body. Therefore, a first group of channels 12 having a higher flow resistance and a second group of channels 8 having a lower flow resistance are provided.

Figure 4:
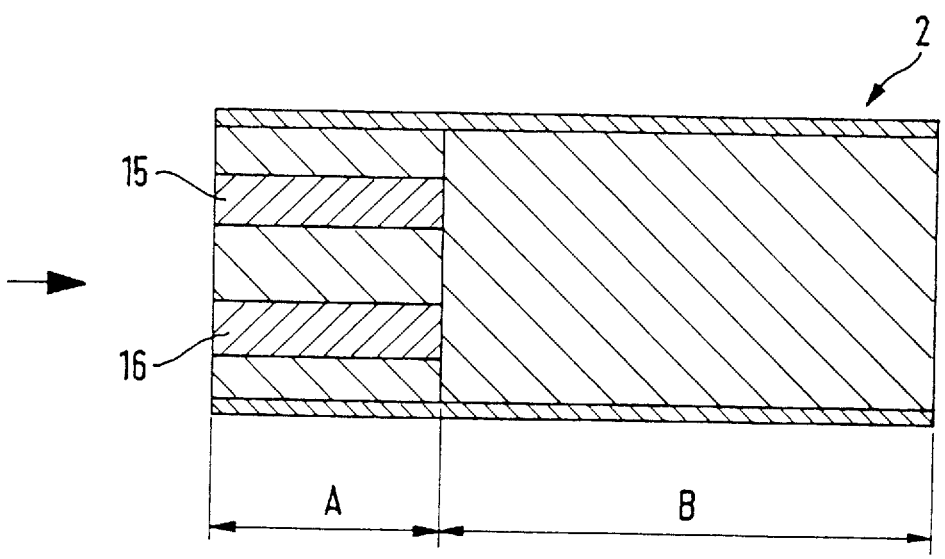
FIG. 4 is a longitudinal-sectional view of the second honeycomb body.

FIG. 4 diagrammatically shows a second honeycomb body 2, which is subdivided into two portions A and B in a flow direction indicated by an arrow. Two regions 15 and 16 are indicated that have an increased number of flow channels per unit of cross-sectional area and therefore an elevated flow resistance. The regions 15 and 16 are located opposite the air gap. The regions 15 and 16 extend over the portion A of the honeycomb body. The cross section of the individual flow channels in the portion B is the same everywhere, which is also possible whenever even further sheet-metal layers of greater corrugation height are provided in the front portion A in order to receive the support elements 3. The regions 15, 16 represent cross-sectionally asymmetrical accumulations or collections of channels with an elevated flow resistance, encompassing only a portion of the cross-sectional area of the honeycomb body, as seen in the circumferential direction and disposed at least in the given region region opposite the air gap 4, 5.

Figure 5:
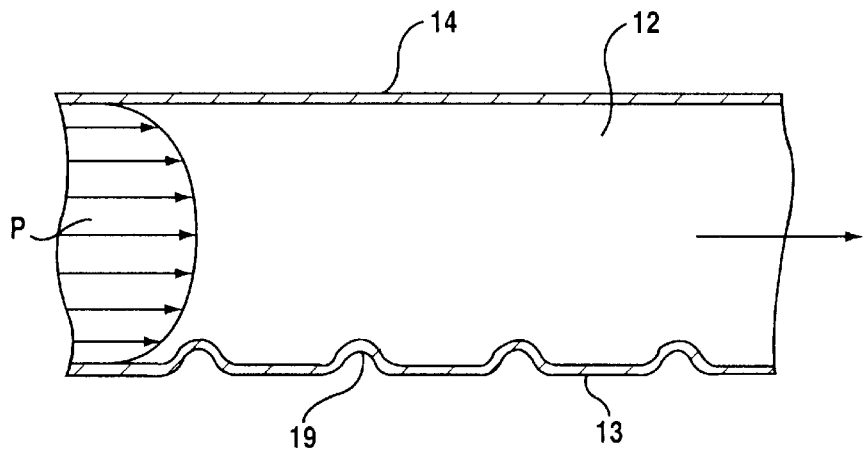
FIG. 5 is a fragmentary, longitudinal-sectional view through a channel of a honeycomb body having additional structures.

FIG. 5 shows another possibility for increasing the flow resistance in a channel 12 of a honeycomb body 2. The flow resistance is increased through the use of additional structures 19 in at least one of the sheet-metal layers forming the channel 12, and in particular in the structured sheet-metal layer 13. Generally this also results in an increase in catalytic activity in a honeycomb body coated with catalytically active material, since the additional structures 19 affect a flow profile p indicated in FIG. 5 and reinforce processes of diffusion. The additional structures 19 are located in beginning and/or end and/or interior portions of the channels 12.

Figure 6:
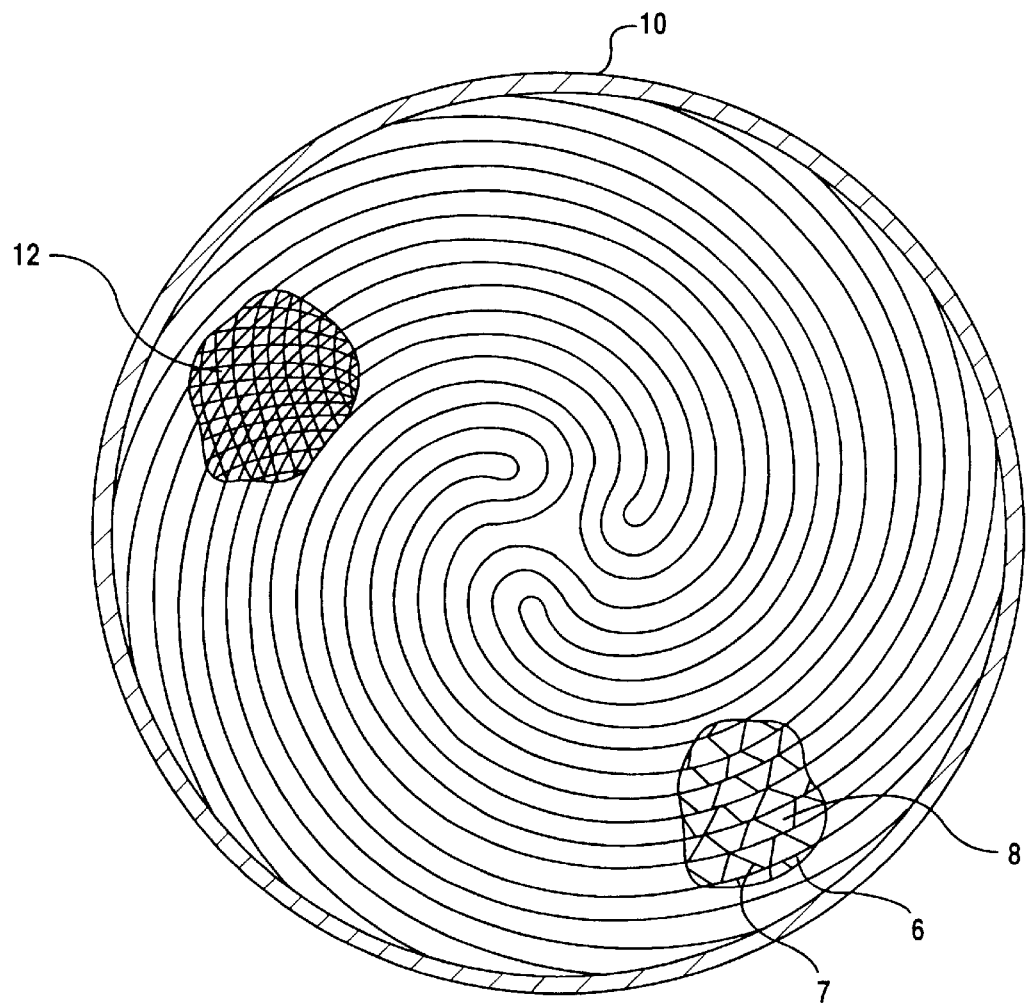
FIG. 6 is an enlarged, cross-sectional view through a honeycomb body including three intertwined stacks of sheet metal layers, one of which has channels of elevated flow resistance.

FIG. 6 shows a cross section of a honeycomb body that is formed of three intertwined stacks of sheet-metal layers which are inserted into a jacket tube 20. One of the stacks is at least partially formed of sheet metal layers having a smaller structure than other corrugated sheets 7, so that the result in this stack is channels 12 with a smaller hydraulic cross section and therefore greater flow resistance. It is precisely the structural form shown as an example herein, with three or more stacks, which allows great versatility in the distribution of the flow resistance over the cross-sectional area, by varying the number and thickness of stacks in combination with differently structured sheet-metal layers 6, 7.

The present invention enables greater flexibility than the prior art in terms of the distribution of the flow resistance over the cross-sectional area of a honeycomb body, in particular through the use of different numbers of channels per unit of cross-sectional area. In a configuration of at least two honeycomb bodies, nonuniformities in the flow through the first honeycomb body can thus be compensated for in the second honeycomb body.

I claim:

1. An apparatus for cleaning exhaust gas, comprising:
   a first electrically heatable honeycomb body and a second honeycomb body downstream of said first honeycomb body, for conducting a flow through said honeycomb bodies in succession;
   said first honeycomb body having a multiplicity of channels through which a fluid can flow, a cross-sectional area, and at least one air gap electrically dividing said first honeycomb body over said cross-sectional area; and
   said second honeycomb body having a given cross-sectional area, a circumference defining a circumferential direction, a given region opposite said at least one air gap, and a multiplicity of channels through which a fluid can flow, said channels including a first group of channels having a higher flow resistance and a second group of channels having a lower flow resistance, and said channels including at least one cross-sectionally asymmetrical accumulation or collection of channels with an elevated flow resistance, said accumulation or collection disposed at least in said given region and encompassing only a portion of said given cross-sectional area as seen in the circumferential direction.

2. The apparatus according to claim 1, wherein said at least one air gap electrically divides said first honeycomb body in at least one of meandering and spiral form.

3. The apparatus according to claim 1, including remaining regions outside said given region, said given region having a greater number of channels per unit of cross-sectional area than said remaining regions.

4. The apparatus according to claim 1, wherein said given region has a varying number of channels per unit of cross-sectional area as seen in a flow direction through said honeycomb body.

5. The apparatus according to claim 4, wherein said number of channels varies in segments.

6. The apparatus according to claim 1, wherein said at least one air gap has an average width, and said channels in said first honeycomb body have a largest diameter at most approximately equal to said average width.

7. The apparatus according to claim 1, wherein said first honeycomb body has a larger number of channels per unit of cross-sectional area than said second honeycomb body.

8. The apparatus according to claim 1, including a plurality of elongated support elements extending between said first and second honeycomb bodies, mechanically connecting said first and second honeycomb bodies and extending at least partway into one channel of said first and one channel of said second honeycomb body, said support elements each having a thick end segment protruding into said one channel of said second honeycomb body and a thin end segment protruding into said one channel of said first honeycomb body, and said thick end segment having a larger cross-sectional area than said thin end segment.

9. The apparatus according to claim 8, wherein said second honeycomb body includes sheet-metal layers extending approximately in a flow direction through said honeycomb body and forming said channels, and said sheet-metal layers include at least two types of differently structured sheet-metal layers determining dimensions of said channels.

10. The apparatus according to claim 8, wherein said second honeycomb body includes at least one first corrugated sheet-metal layer disposed opposite said at least one air gap and having a lesser corrugation height, and at least one second corrugated sheet-metal layer receiving said support elements and having a greater corrugation height.

11. The apparatus according to claim 10, wherein said second honeycomb body has a front portion, and said differently structured sheet-metal layers each extend over only said front portion.

12. The apparatus according to claim 11, wherein said second honeycomb body has at least one portion downstream of said front portion as seen in the flow direction, and said at least one downstream portion has a number of channels varying in the flow direction relative to said given cross-sectional area.

13. The apparatus according to claim 12, wherein said number of channels increases downstream of said at least one corrugated sheet-metal layer of greater corrugation height and decreases downstream of said at least one corrugated sheet-metal layer of lesser corrugation height.

14. The apparatus according to claim 12, wherein said number of channels increases downstream of said at least one corrugated sheet-metal layer of greater corrugation height.

15. The apparatus according to claim 12, wherein said number of channels decreases downstream of said at least one corrugated sheet-metal layer of lesser corrugation height.

16. The apparatus according to claim 1, wherein said first and second honeycomb bodies are formed of intertwined sheet-metal layers having intertwining courses in both of said honeycomb bodies oriented substantially in alignment with one another.

17. The apparatus according to claim 16, wherein said sheet-metal layers are a stack of sheet-metal layers intertwined in an S shape and having the same alignment and stack height.

\* \* \* \* \*